(12) United States Patent
Chou

(10) Patent No.: US 7,176,595 B1
(45) Date of Patent: Feb. 13, 2007

(54) SUPPORT DEVICE OF A MOTOR SHAFT

(75) Inventor: Chu-Hsien Chou, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/236,505

(22) Filed: Sep. 28, 2005

(51) Int. Cl.
*H02K 7/08* (2006.01)

(52) U.S. Cl. .......................................... 310/90; 310/91

(58) Field of Classification Search .................. 310/90, 310/91
See application file for complete search history.

(56) References Cited

U.S. PATENT DOCUMENTS 5,982,064 A * 11/1999 Umeda et al. ................ 310/90

6,617,730 B2 * 9/2003 Horng et al. .................. 310/90

\* cited by examiner

*Primary Examiner*—Darren Schuberg
*Assistant Examiner*—Nguyen Hanh

(57) ABSTRACT

A support device of a motor shaft includes a shaft, a shaft seat and a bearing. The shaft is joined to a fan blade set at an end thereof and provides a circular shape at another end thereof. The shaft seat has a circular recess corresponding to the circular end so as to join with the shaft. The bearing fits with the shaft to support the shaft during the shaft rotating and the shaft seat further has a hollow space at the center thereof to receive the shaft. Due to being attached to the shaft seat and supported, the shaft is capable of rotating steadily to overcome deficiency of swinging residing in the prior art.

1 Claim, 1 Drawing Sheet

SUPPORT DEVICE OF A MOTOR SHAFT

BACKGROUND OF THE INVENTION

1. Field of the Invention

The present invention is related to a support device of a motor shaft and particularly to a support device, which provides a shaft seat with a shape accommodating an end of the shaft in company with a bearing fitting with and supporting the shaft to locating the shaft in rotation.

2. Brief Description of the Related Art

Referring to FIG. 1, the conventional support device of a motor shaft provides a hollow shaft seat 31 in a fan base 30 receives a shaft 12 and a bearing 32 is disposed between outer surface of the shaft 12 and the shaft seat 31 to allow the shaft 12 rotates with support of the bearing 32. The shaft seat 31 has a protrusion part 311 and a catch part 312 and a retaining ring 14 engages with the shaft 12 such that the bearing 32 is located in place against the protrusion 311 and the catch part 312. Further, interference is created between the retaining ring 14 and bearing 32 to prevent the shaft from moving away the shaft seat 13 during in a state of running. However, clearance between the bearing 32 and the shaft 12 results in deficiencies such as the shaft swinging and creating noise during running.

SUMMARY OF THE INVENTION

In order to solve the preceding problems, an object of the present invention is to provide a support device of motor shaft in which the shaft seat has a specific shape to accommodate the shaft, such that the shaft is located in place by way of being supported by the bearing and shaft seat to avoid undesirable swinging and noise.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
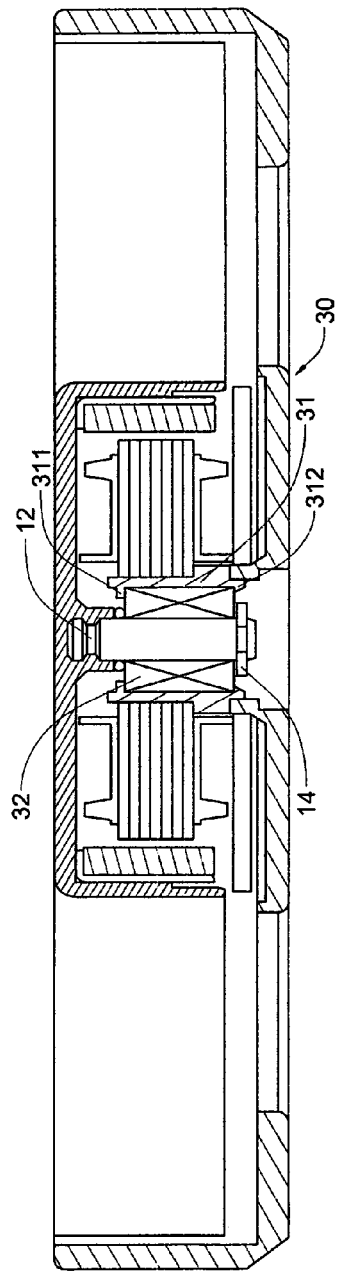
FIG. 1 is a sectional view of the conventional support device of a motor shaft.
Figure 2:
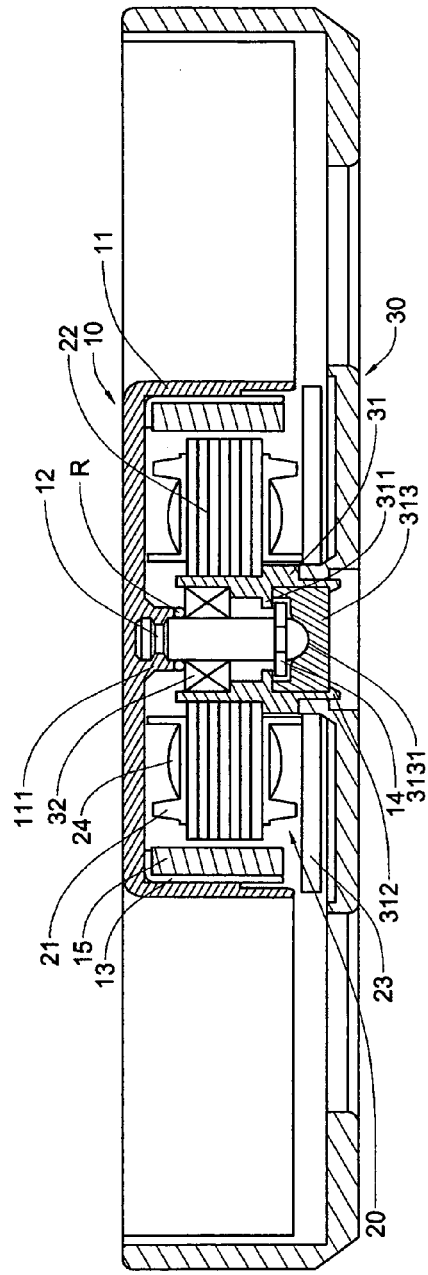
FIG. 2 is a sectional view of a support device of a motor shaft according the present invention.

Referring to FIG. 2, a preferred embodiment of a fan motor according to the present invention includes a fan blade set 10, a motor set 20 and a fan base 30. The fan blade set 10 further includes a fan blade hub 11, a shaft 12, a motor case 13 and a plurality of magnetic strips 15. An end of the shaft 12 is rotationally attached to a bore-shaped hub seat 111 formed at the center of the fan blade hub 11. The motor case 13 is provided at the inner side of the fan blade hub 11 and the magnetic strips 15 are disposed at the inner side of the motor case 13.

The motor set 20 is disposed in a space surrounded by the magnetic strips 15 and further includes an insulation frame 21, a plurality of silicone steel sheets 22, a circuit board 23 and a plurality of coils 24. The silicone steel sheets 22 are stacked to each other and disposed at the outer side of the insulation frame 21 and the coils 24 are wound to surround the insulation frame 21. The fan base 30 has a hollow shaft seat 31, which extends from the bottom of the center thereof and is surrounded with the silicone steel sheets 22. The circuit board 23 is provided between the bottom of insulation frame 21 and the fan base 30. The shaft seat 31 has an inner diameter reduced neck section at the middle of the inner wall thereof with an annular step at the top thereof such that the circumferential side of a bearing 24 fits with the upper section of the shaft seat 31 in a way of a lateral side of the bearing 32 resting on the step. The bearing 32 is disposed in the shaft seat 31 to fit with the bearing 32 and the other end of the shaft 12, which is a circular end, extends toward the bottom of the fan base 30 through the bearing 32. An oil ring R is provided to surround the shaft 12 between the bearing 32 and the center of the fan blade hub 11.

The shaft seat 31 further has a ring-shaped projection 311 right under the neck section and a lower hook end 312 A retaining ring 14 engages with the shaft 12 at the circular end thereof. A lower hollow space of the shaft seat 31 is formed between the projection 311 and the lower hook end 312 for accommodating a circular shaft support block 313. The circumferential side of the shaft support block 313 is joined to the wall surface of the lower hollow space and the top of the shaft support block 313 has an annular recess to correspond to the retaining ring 14 with a semicircular indentation 3131 at the center of the recess corresponding to the circular end of the shaft 12. Further, the radius of the semicircular indentation 3131 is the same as the circular end of the shaft 12. The bottom of the shaft support block 313 is held with the hook end 312 of the shaft seat 31 and the too thereof contacts with the bottom of the projection 311. The circular end of the shaft 12 rests on the semicircular indentation 3131 and the retaining ring 14 is received in the recess under the projection 311. Interference occurs between the projection 311 and the retaining ring 14 to prevent the shaft 12 from misalignment. In the mean time, the shaft 12 is capable of rotating steadily due to being supported with the support block 313 and the bearing 24.

The shaft 12 is located in place with support of both the shaft seat 31 and the bearing 32 so as to form a state of steady rotation. In this way, deficiency of the conventional shaft being easily swinging can be overcome and noise resulting from friction can be reduced. In addition, life span of the motor can be increased substantially.

While the invention has been described with referencing to preferred embodiments thereof, it is to be understood that modifications or variations may be easily made without departing from the spirit of this invention, which is defined by the appended claims.

What is claimed is:

1. A fan motor, comprising:

a fan blade hub with a central bore;

a fan base, being disposed opposite to the fan blade hub;

a cylindrical shaft seat, extending toward the fan blade hub from the fan base with a lower hook end;

a shaft with two ends, one of the ends being rotationally joined to the central bore and the other one of the ends being a circular end and extending in the shaft seat toward the fan base;

a bearing, being attached to the inner wall surface of the shaft seat and fitting with the shaft; and a retaining ring, being disposed at the circular end of the shaft to clamp the shaft;

characterized in that the shaft seat has a diameter-reduced neck section at the middle of the inner wall with an annular step at the top of the diameter-reduced neck section for the circumferential side of the bearing being attached to an upper section of the shaft seat in a way of a lateral side of the bearing resting on the step; a ring-shaped projection is provided at the bottom of the diameter reduced section; a lower hollow space is formed between the ring-shaped projection and the lower hook end for accommodating a circular shaft support block in a way of the circumferential side of the shaft support block is joined to the wall surface of the lower hollow space and the top of the shaft support block being joined to the bottom of the neck section; an annular recess is provided at the top of the shaft support block corresponding to the retaining ring with a semicircular indentation being arranged at the center of the recess corresponding to the circular end of the shaft and the radius of the indentation being the same as the radius of the circular end such that the bottom of the shaft support block is held with the hook end for the circular end of the shaft capable of resting on the semicircular indentation and the retaining ring being capable of being received in the recess.

* * * * *